(12) United States Patent
Oyobe et al.

(10) Patent No.: US 9,193,267 B2
(45) Date of Patent: Nov. 24, 2015

(54) CONTROL DEVICE FOR VEHICLE

(75) Inventors: Hichirosai Oyobe, Nagoya (JP); Kenji Yamada, Komaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/382,502

(22) PCT Filed: Mar. 22, 2012

(86) PCT No.: PCT/JP2012/057274
§ 371 (c)(1),
(2), (4) Date: Sep. 2, 2014

(87) PCT Pub. No.: WO2013/140559
PCT Pub. Date: Sep. 26, 2013

(65) Prior Publication Data
US 2015/0151639 A1    Jun. 4, 2015

(51) Int. Cl.
*B60L 11/00* (2006.01)
*B60W 20/00* (2006.01)
*H02P 6/16* (2006.01)
*B60L 11/18* (2006.01)
*B60L 11/12* (2006.01)
(Continued)

(52) U.S. Cl.
CPC . *B60L 11/18* (2013.01); *B60L 3/12* (2013.01);
*B60L 11/126* (2013.01); *B60L 11/14* (2013.01);
*B60W 10/08* (2013.01); *B60W 10/26* (2013.01);
*H02P 6/16* (2013.01); *B60L 2240/12* (2013.01);
*B60L 2240/421* (2013.01); *B60L 2240/423*
(2013.01); *B60L 2240/441* (2013.01); *B60L
2240/445* (2013.01); *B60L 2250/26* (2013.01);
*Y02T 10/6217* (2013.01); *Y02T 10/642*
(2013.01); *Y02T 10/7005* (2013.01); *Y02T
10/7077* (2013.01)

(58) Field of Classification Search
None
See application file for complete search history.

(56) References Cited

U.S. PATENT DOCUMENTS

2005/0104551 A1    5/2005    Nishimura et al.
2005/0257546 A1    11/2005    Ishishita
(Continued)

FOREIGN PATENT DOCUMENTS

JP    A-2004-266935    9/2004
JP    A-2005-333738    12/2005
(Continued)

OTHER PUBLICATIONS

Feb. 6, 2015 Office Action issued in Korean Patent Application No. 2014-7025908.

*Primary Examiner* — Rami Khatib
*Assistant Examiner* — Navid Ziaeianmehdizadeh
(74) *Attorney, Agent, or Firm* — Oliff PLC

(57) ABSTRACT

A control device is applied to a vehicle having a motor with a rotary shaft connected to a drive shaft of the vehicle, a rotational position detector to detect a rotational position of the rotary shaft of the motor, and a battery. The control device performs a procedure for obtaining an offset amount in response to a request for obtaining the offset amount, store the obtained offset amount, and keep the stored offset amount without relying on electric power supplied from the battery, which offset amount is a difference between a detected rotational position of the rotary shaft with the rotational position detector and an actual rotational position of the rotary shaft. The control device is configured to find an occurrence of the request for obtaining the offset amount when battery is dismounted from the vehicle.

8 Claims, 3 Drawing Sheets

(51) Int. Cl.
   *B60L 11/14*   (2006.01)
   *B60L 3/12*    (2006.01)
   *B60W 10/08*   (2006.01)
   *B60W 10/26*   (2006.01)

(56) References Cited

U.S. PATENT DOCUMENTS

| | | | |
|---|---|---|---|
| 2008/0129241 A1* | 6/2008 | Yu et al. | 318/605 |
| 2010/0231151 A1* | 9/2010 | Ohtani et al. | 318/400.09 |
| 2011/0241578 A1* | 10/2011 | Kim et al. | 318/400.02 |
| 2011/0260663 A1* | 10/2011 | Jeon et al. | 318/400.04 |
| 2013/0173108 A1* | 7/2013 | Hashimoto | 701/22 |
| 2014/0062353 A1* | 3/2014 | Oyobe et al. | 318/400.02 |
| 2014/0062359 A1* | 3/2014 | Oyobe et al. | 318/400.13 |
| 2014/0167663 A1* | 6/2014 | Ide et al. | 318/400.09 |

FOREIGN PATENT DOCUMENTS

| | | |
|---|---|---|
| JP | A-2007-336707 | 12/2007 |
| JP | 2008-043183 A | 2/2008 |
| KR | 2011-0048979 A | 5/2011 |

\* cited by examiner

CONTROL DEVICE FOR VEHICLE

TECHNICAL FIELD

This invention relates to a control device for vehicle, which control device is applied to a vehicle that has a motor with a rotary shaft connected to a drive shaft of the vehicle and a rotational position detector to detect a rotational position of the rotary shaft of the motor.

BACKGROUND ART

Various types of vehicles with the motor as the drive source to generate drive force to run the vehicles (for example, hybrid vehicles and electric vehicles) are conventionally designed. In particular, for example, the hybrid vehicle drives by the configuration of transmitting torque generated from one or both of the motor and an internal combustion engine toward a drive shaft connected with drive wheels.

On this kind of motor, the rotational position of the rotary shaft is detected with a rotational position detector in order to control the amount of torque generated on the rotary shaft and the rotational speed of the rotary shaft so as to be appropriate values according to operational statuses of the vehicle. However, the rotational position of the rotary shaft detected with the rotational position detector does not necessarily match to the actual rotational position of the rotary shaft in general, due to variations in mounting position of the motor and the rotational position detector on the vehicle and variations when manufacturing the motor and the rotational position detector themselves.

For this reason, the motor is operated while considering the difference between the rotational position of the rotary shaft detected with the rotational position detector and the actual rotational position thereof (hereinafter referred to as "offset amount") on the vehicle with this kind of motor.

One of conventional control device for vehicle (hereinafter referred to as "conventional device"), for example, is applied to a vehicle that has a transmission integrally composed of a motor and a rotational position detector (resolver), and stores an offset amount in a storage device installed in the transmission, which offset amount was obtained in advance (for example, see the patent literature 1).

In cases where a failure of the motor, etc. occurs in the vehicle with the conventional device, the whole of the transmission is dismounted from the vehicle. Next, when the motor is replaced or repaired, the offset amount of the rotational position detector is obtained by a predetermined method (a method to obtain the offset amount), and the obtained offset amount is stored in the storage device before the transmission is mounted in the vehicle. After that, the transmission is mounted in the vehicle. Thereby, the conventional device can store an appropriate offset amount in the storage device even when the motor is replaced or repaired. As described above, an appropriate offset amount has been desired to be recognized, even in the case that a member having an impact on the offset amount of the rotational position detector (the motor of the conventional device) is in need of replacement or the like.

CITATION LIST

Patent Literature 1: JP2007-336707A

SUMMARY OF INVENTION

1. Technical Problem

The conventional device is designed based on an assumption that "an operator reliably performs the procedure for obtaining the offset amount in the case of the replacement or the like of the member which has an impact on the offset amount". In other words, the conventional device is designed based on an assumption that "there is no possibility that the operator forgets to perform the procedure for obtaining the offset amount".

The above assumption is generally thought to be reasonable as far as the replacement or the like of the member is done according to the work procedure manual. However, the possibility that the replacement or the like of the member is not done sufficiently according to the work procedure manual cannot be completely denied. Consequently, the offset amount stored in the storage device does not necessarily match to the actual offset amount in the case that the member (i.e., the transmission including the member) is mounted in the vehicle without executing the procedure for obtaining the offset amount.

As described above, the conventional device cannot always recognize an appropriate offset amount in the case that the member that has an impact on the offset amount of the rotational position detector is in need of replacement or the like. In this case, the problem is that the conventional device may not appropriately control the motor.

In addition, the above problem may occur in the case that the procedure for obtaining the offset amount is performed "before" mounting the member having an impact on the offset amount in the vehicle or in the case that the procedure for obtaining the offset amount is performed "after" mounting the member having an impact on the offset amount in the vehicle, as is understandable from the above. Furthermore, the above problem may occur in the case that the member having an impact on the offset amount is dismounted and remounted "integrally" with the member storing the offset amount or in the case that the member having an impact on the offset amount is dismounted and remounted "separately" with the member storing the offset amount.

In view of the above technical problems, it is an object of the present invention to provide a control device for vehicle, which control device can surely perform the procedure for obtaining the offset amount of the rotational position detector even in the case of the replacement or the like of the member having an impact on the offset amount.

2. Solution to Problem

The control device of the present invention, for solving the above technical problem, is applied to the vehicle having a motor with a rotary shaft connected to a drive shaft of the vehicle, a rotational position detector to detect a rotational position of the rotary shaft of the motor, and a battery.

The control device of the present invention comprises a configuration to perform "a procedure for obtaining an offset amount" in response to a request for obtaining the offset amount, store the obtained offset amount, and keep the stored offset amount "without relying on" electric power supplied from the battery, which offset amount is a difference between a detected rotational position of the rotary shaft with the rotational position detector and an actual rotational position of the rotary shaft.

Furthermore, the control device is configured to find an occurrence of the request for obtaining the offset amount when "the battery being dismounted from the vehicle".

The control device of the present invention will be described below from one point of view.

In general, when a member having an impact on the offset amount (e.g., a motor and a rotational position detector) is in need of replacement or the like, parts or members that need to be considered in order to actually achieve the operation of the replacement and the like (hereinafter referred to as "associated member") are also to be dismounted from a vehicle. The associated members are mainly defined based on the structure of the vehicle. Examples of the associated member include members that physically obstruct the operation of the replacement or the like, and members that are required to be dismounted to safely perform the replacement or the like. In particular, batteries are usually dismounted from the vehicle as the associated member at least for the reason of safely performing the replacement or the like (or the reason of being a physical obstacle depending on the structure of the vehicle), which is the same as a normal maintenance of the vehicle.

In view of the above reasons, the control device of the present invention finds (in other words, assumes) "an occurrence of the request for obtaining the offset amount" when the battery is dismounted from the vehicle. Consequently, the procedure for obtaining the offset amount is to be performed even in the case that an operator forgot performing the procedure for obtaining the offset amount (or, providing a request for obtaining the offset amount to the control device) when the member having an impact on the offset amount had been replaced. The control device of the present invention therefore can surely perform the procedure for obtaining the offset amount of the rotational position detector in the case of the replacement or the like of the member having an impact on the offset amount.

In addition, the battery may be dismounted from the vehicle not only because of the replacement or the like of the member having an impact on the offset amount but also because of other reason. In other words, the fact that the battery was dismounted from the vehicle does not necessarily mean the replacement or the like of the member having an impact on the offset amount. Nonetheless, there is a possibility of the replacement or the like of the member having an impact on the offset amount in the case that the battery is dismounted from the vehicle, as described above. In view of this, the control device of the present invention finds (in other words, assumes) "an occurrence of the request for obtaining the offset amount" when the battery is dismounted from the vehicle in order to surely perform the procedure for obtaining the offset amount in the case of the replacement or the like of the member having an impact on the offset amount.

Next, the control device of the present invention will be described below from another point of view.

A vehicle generally has multiple members having an impact on the offset amount (e.g., a motor and a rotational position detector). Hence, a complicated process (e.g., installing memory devices on each members, which memory devices store information to enable to identify these members, and monitoring the information) may be required on the control device for recognizing the replacement or the like of one or more of those members (or, the occurrence of a request for obtaining the offset amount due to the replacement or the like).

To the contrary, the control device of the present invention finds an occurrence of the request for obtaining the offset amount when the battery is dismounted from the vehicle, and therefore can more easily recognize the occurrence of the request without requiring such complicated process discussed above.

Next, the control device of the present invention will be described below from still other point of view.

Control Parameters for vehicle (e.g., various sort of characteristic values on the vehicle) are generally stored in a memory device that keeps such information "relying on" electric power supplied from a battery. As a result, the control parameters vanish when the battery is dismounted from the vehicle. In view of this, a procedure for obtaining such vanished parameters may be performed (or, the occurrence of the request for obtaining the parameters may be found) in order to obtain the parameters again when the battery is dismounted from the vehicle.

To the contrary, the offset amount according to the control device of the present invention is kept in the control device "without relying on" electric power supplied from the battery. As a result, the offset amount stored in the control device does not vanish even when the battery is dismounted from the vehicle. In other words, the request for obtaining the offset amount could never arise from the viewpoint of re-obtaining vanished parameter, unlike the above example. Nonetheless, as described above, there is a possibility of the replacement or the like of the member having an impact on the offset amount in the case that the battery is dismounted from the vehicle. In view of this, the control device of the present invention dares to determine that the request for obtaining the offset amount arises in this case (in spite of the configuration that the offset amount itself is kept in the control device) in consideration of the possibility that the stored offset amount in the control device is different from the actual offset amount.

As described above, the control device of the present invention can surely perform the procedure for obtaining the offset amount of the rotational position detector in the case of the replacement or the like of the member having an impact on the offset amount.

By the way, the "motor" may be a motor that can be applied to vehicles (e.g., hybrid vehicles and electric vehicles), and is not specifically limited in its type, structure and the number thereof mounted in the vehicle.

The "rotational position detector" may be a detector that can detect the rotational position of the rotary shaft (i.e., the angle of rotation when the rotary shaft rotates), and is not specifically limited in its structure and the number thereof installed in the vehicle. The rotational position can be detected as a degree of rotation of the rotary shaft (an absolute angle or a relative angle) with reference to a predetermined base position (e.g., the position where the angle of rotation is zero). Examples of the rotational position detector include a resolver.

The "battery" may be a battery that can applied to vehicles and be generally dismounted from the vehicles from various viewpoints in the case of the replacement or the like of the member having an impact on the offset amount, and is not specifically limited in its structure and the number thereof installed in the vehicle. In the case that the vehicle has multiple batteries, at least one of the multiple batteries may be employed as the battery.

The "procedure for obtaining the offset amount" may be a procedure that can obtain the offset amount of the rotational position detector, and is not specifically limited in its specific process, conditions to perform the procedure and required accuracy for obtaining the offset amount. Examples of the procedure for obtaining the offset amount, in the case that a resolver is employed as the rotational position detector, include a procedure where the offset amount is obtained based on the d-axis voltage when the d-axis current and the q-axis current in the magnetic polar coordinate system (the d-q coordinate system) of the motor are zero (for example, please see JP 2004-266935), and a procedure where the offset amount is obtained based on the value of the q-axis current while generating the predetermined detective magnetic field around the rotor of the motor generator at rest.

The phrase that the battery is "dismounted from the vehicle" includes the physical separation of the battery from the vehicle and the electrical interrupt of an energizing path between the battery and the vehicle (e.g., the disconnection of a cable (harness) for energizing).

The procedure for setting a reference position for the rotational position (e.g., a position at which the rotational position is assumed to be zero) in consideration of the obtained offset amount is hereinafter referred to as "origin point correction".

The control device of the present invention can be employed in the case that the procedure for obtaining the offset amount is performed before the member having an impact on the offset amount is mounted on the vehicle, as well as in the case that the procedure for obtaining the offset amount is performed after the member having an impact on the offset amount is mounted on the vehicle. Furthermore, the control device of the present invention can be employed in the case that the member having an impact on the offset amount is integrally mounted and dismounted with the control device, as well as in the case that the member having an impact on the offset amount is separately mounted and dismounted from the control device.

The control device of the present invention performs the procedure for obtaining the offset amount in response to the request for obtaining the offset amount. The procedure for obtaining the offset amount may require that the status of the vehicle is a specific status in order to perform the procedure appropriately depending on the procedure to be employed.

In view of the above, for example, the control device of the present invention may be configured, as a specific embodiment, as follows:

the control device further determines whether or not "a condition to enable the procedure for obtaining the offset amount is satisfied" in the case of finding the occurrence of the request for obtaining the offset amount;

the control device performs the procedure for obtaining the offset amount in the case that the condition is satisfied; and the control device withholds the procedure for obtaining the offset amount until the condition is satisfied in the case that the condition is not satisfied.

The above configuration allows the control device to perform the procedure for obtaining the offset amount at an appropriate timing depending on the procedure for obtaining the offset amount.

The "condition to enable the procedure to obtain the offset amount" may be a condition that takes into account specific processes of the employed procedure for obtaining the offset amount, and is not specifically limited. Examples of the condition to enable the procedure to obtain the offset amount include the following conditions: whether or not a start-up instruction is sent to the vehicle (for example, whether or not the position of the ignition key switch is changed from off to on, or whether or not a start-up button is pushed); and whether or not the number of rotations per unit time (the rotational speed) of the rotary shaft of the motor and a magnitude of torque generated on the rotary shaft both satisfy a predetermined condition (for example, whether or not the rotational speed of the rotary shaft is equal to or larger than a predetermined threshold value, and the magnitude of torque on the rotary shaft is zero).

The control device is not specifically limited in way to recognize that the battery is dismounted from the vehicle.

For example, the control device of the present invention may be configured, as a specific embodiment, as follows:

the control device determines that the battery is dismounted from the vehicle in the case that an always-connected energizing path to the battery was once interrupted and followed by the path is re-connected.

As described above, the battery is usually dismounted from the vehicle in general in the case of the replacement or the like of the member having an impact on the offset amount.

The control device of the present invention may be configured, in view of the clarity in the above point, so that the battery is dismounted from the vehicle when a member having an impact on the offset amount is dismounted from the vehicle.

The "member having an impact on the offset amount" may be a member that has any relation to the offset amount, is not specifically limited. Examples of the member having an impact on the offset amount include the followings: a motor; a rotational position detector; a member for fixing the motor and the rotational position detector on the vehicle; a transaxle including the motor, the rotational position detector and a gearing system; and a part of the control device, which part stores the offset amount.

As described above, the control device of the present invention has an advantageous effect that the control device can surely perform the procedure for obtaining the offset amount of the rotational position detector in the case of the replacement or the like of the member having an impact on the offset amount.

DESCRIPTION OF EMBODIMENTS

Figure 1:
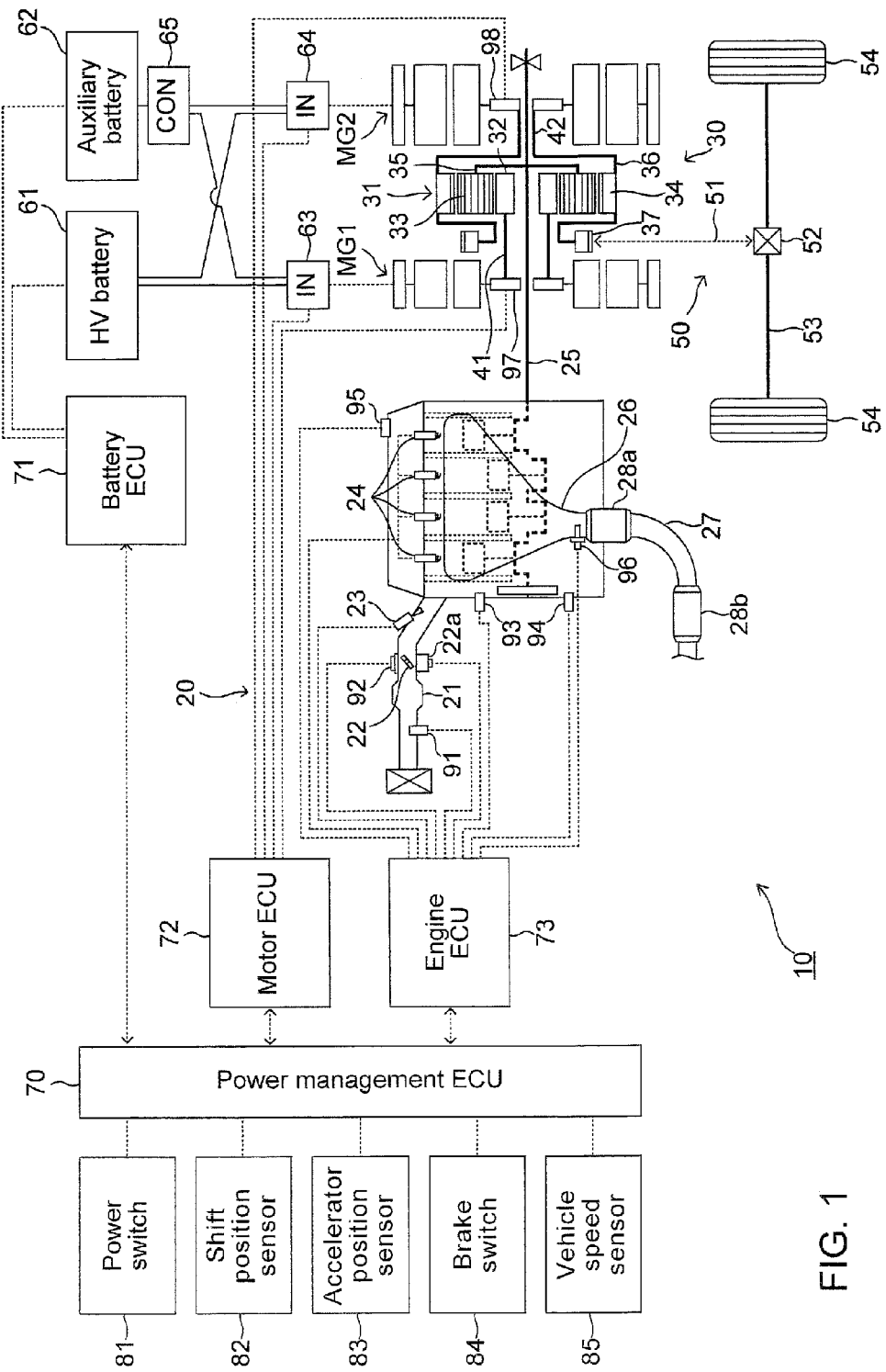
FIG. 1 is a schematic diagram of a vehicle to which a control device according to the first embodiment of the invention is applied.

Hereinafter, embodiments of the control device of the present invention (the first embodiment to the second embodiment) will be described by referring to the drawings.

First Embodiment

Outline of Device

FIG. 1 illustrates a schematic configuration of a system in which the control device according to the first embodiment of the present invention (hereinafter referred to as "first device") is applied to a hybrid vehicle 10. The hybrid vehicle 10 is hereinafter simply referred to as "vehicle 10" for the sake of convenience.

The vehicle 10 has, as illustrated in FIG. 1, a motor generator MG1, a motor generator MG2, an internal combustion engine 20 (hereinafter simply referred to as "engine 20"), a power distribution mechanism 30, a rotary shaft 41 of the motor generator MG1, a rotary shaft 42 of the motor generator MG2, a power transmission mechanism 50, a drive shaft 53 of the vehicle 10, a HV battery 61, an auxiliary battery 62, a first inverter 63, a second inverter 64, a power management ECU 70, a battery ECU 71, a motor ECU 72, an engine ECU 73, and multiple sensors 81 to 85, 91 to 98 (including resolvers 97, 98). In addition, ECU stands for "electric control unit" and is an electric control circuit that has, as the main component, a microcomputer including a CPU, a ROM, a RAM, an interface, etc.

The motor generator MG1 is a synchronous motor generator that can work as the both of an electric generator and an electric motor. The motor generator MG1 is referred to as the first motor generator MG1 for the sake of convenience. The first motor generator MG1, in this embodiment, mainly serves as an electric generator. The first motor generator MG1 has a rotary shaft 41 (hereinafter referred to as "first shaft").

The motor generator MG2 is a synchronous motor generator that can work as the both of an electric generator and an electric motor, which is the same as the first motor generator MG1. The motor generator MG2 is referred to as the second motor generator MG2 for the sake of convenience. The second motor generator MG2, in this embodiment, mainly serves as an electric motor. The second motor generator MG2 has a rotary shaft 42 (hereinafter referred to as "second shaft").

The second motor generator MG2 has a rotor connected to the rotary shaft 42 and a stator. The second motor generator MG2 is configured to output torque on the rotary shaft 42 (i.e., generate force in the direction to rotate the rotor) by the sequential application of electric current to circuits (winding wires) therein so as to sequentially generate magnetic fields in the direction where the rotor rotates with respect to the stator, which circuits correspond to each magnetic fields. In addition, the configuration of the first motor generator MG1 is the same as that of the second motor generator MG2 except that it outputs torque on the rotary shaft 41.

The engine 20 is a four-cycle spark-ignited multicylinder internal combustion engine. The engine 20 has an intake passage part 21 including an intake pipe and an intake manifold, a throttle valve 22, a throttle valve actuator 22a, multiple fuel injectors 23, multiple ignition devices 24 including ignition plugs, a crankshaft 25 which is the output shaft of the engine 20, an exhaust manifold 26, an exhaust pipe 27, and exhaust purification catalysts 28a, 28b.

The throttle valve 22 is rotatably supported on the intake passage part 21. The throttle valve actuator 22a is configured to rotate the throttle valve 22 in response to an instruction signal from the engine ECU 73 so as to change the cross-sectional area of the intake passage part 21.

Each of the multiple fuel injectors 23 (Note that single fuel injector 23 is illustrated in FIG. 1) is installed on the engine 20 so that the discharge hole thereof is exposed in each intake port connected to the combustion chamber. Each fuel injector 23 is configured to inject a predetermined amount of fuel into the intake port in response to an instruction signal from the engine ECU 73.

Each of ignition devices 24 is configured to generate ignition sparks in the combustion chamber belonging to each cylinder at specific ignition timings (time of ignition) in response to an instruction signal from the engine ECU 73.

The crankshaft 25 is connected to the power distribution mechanism 30 and enables the torque generated from the engine 20 to input to the power distribution mechanism 30.

The exhaust purification catalysts 28a, 28b is installed at a portion of the exhaust manifold 26 to which portion the exhaust gas is to be collected and the exhaust pipe 27 lay downstream of the exhaust manifold 26. The exhaust purification catalysts 28a, 28b are configured to purify unburned matters (e.g., HC and CO) and nitrogen oxide (NOx) emitted from the engine 20.

The power distribution mechanism 30 has a well-known planetary gear mechanism 31. The planetary gear mechanism 31 has a sun gear 32, multiple planetary gears 33 and a ring gear 34.

The sun gear 32 is connected to the first shaft 41 of the first motor generator MG1. Hence, the first motor generator MG1 can output torque to the sun gear 32. To the contrary, the first motor generator MG1 can generate electricity when being rotationally-driven by torque input from the sun gear 32 to the first motor generator MG1 (i.e., the first shaft 41). The sun gear 32 is connected to the drive shaft 53 via multiple gears described below (e.g., the planetary gears 33, the ring gear 34, an output gear 37, a gear train 51 and a differential gear 52). As a result, the first motor generator MG1 and the drive shaft 53 are connected to allow torque to transmit therebetween.

Each of the multiple planetary gears 33 engages with the sun gear 32 and also engages with the ring gear 34. The rotary shaft (rotation axis) of the planetary gear 33 is fixed on a planetary carrier 35. The planetary carrier 35 is supported in the mechanism so as to be coaxially rotatable with the sun gear 32. The ring gear 34 is similarly supported in the mechanism so as to be coaxially rotatable with the sun gear 32. As a result, the rotating planetary gears 33 can revolve on the outer periphery of the sun gear 32. The planetary carrier 35 is configured to the crankshaft 25 of the engine 20. As a result, the planetary gears 33 can be rotationally-driven by torque input from the crankshaft 25 to the planetary carrier 35.

Additionally, the planetary gear 33 engages with the sun gear 32 and the ring gear 34, as described above. As a result, when the planetary gears 33 input torque to the sun gear 32, the sun gear 32 is rotationally-driven by the torque. When the planetary gears 33 input torque to the ring gear 34, the ring gear 34 is rotationally-driven by the torque. To the contrary, when the sun gear 32 inputs torque to the planetary gears 33, the planetary gears 33 are rotationally-driven by the torque. When the ring gear 34 inputs torque to the planetary gears 33, the planetary gears 33 are rotationally-driven by the torque.

The ring gear 34 is connected to the second shaft 42 of the second motor generator MG2 via a ring gear carrier 36. Hence, the second motor generator MG2 can output torque to the ring gear 34. To the contrary, the second motor generator MG2 can generate electricity when being rotationally-driven by torque input from the ring gear 34 to the second motor generator MG2 (i.e., the second shaft 42). The ring gear 34 is connected to the drive shaft 53 via multiple gears described below (e.g., an output gear 37, a gear train 51 and a differential gear 52). As a result, the second motor generator MG2 and the drive shaft 53 are connected to allow torque to transmit therebetween.

Additionally, the ring gear 34 is connected to the output gear 37 via the ring gear carrier 36. As a result, the output gear 37 can be rotationally-driven by torque input from the ring gear 34 to the output gear 37. To the contrary, the ring gear 34 can be rotationally-driven by torque input from the output gear 37 to the ring gear 34.

The power distribution mechanism 30 has the gear train 51, the differential gear 52 and the drive shaft 53.

The gear train 51 connects the output gear 37 and the differential gear 52 with gear mechanism to allow power to transmit therebetween. The differential gear 52 is installed to the drive shaft 53. The drive wheels 54 are installed at the both ends of the drive shaft 53. As a result, the torque from the output gear 37 is transmitted to the drive wheels 54 via the gear train 51, the differential gear 52 and the drive shaft 53. The hybrid vehicle 10 can run by using this torque transmitted to the drive shaft 53.

The HV battery 61 is a chargeable/dischargeable secondary battery that supplies electric power to the first motor generator MG1 and the second motor generator MG2 to operate the motors or stores electric power generated at the first motor generator MG1 and the second motor generator MG2. The HV battery 61 has the larger rated voltage and the larger capacity compared with the auxiliary battery 62.

The HV battery 61 is electrically-connected to the first motor generator MG1 via the first inverter 63, electrically-connected to the second motor generator MG2 via the second inverter 64, and electrically-connected to the battery ECU 71. In other words, the HV battery 61 is connected to the first motor generator MG1, the second motor generator MG2 and the battery ECU 71 via always-connected energizing paths thereto.

The first motor generator MG1 is rotationally-driven by using the electric power supplied from the HV battery 61 via the first inverter 63. The second motor generator MG2 is rotationally-driven by using the electric power supplied from the HV battery 61 via the second inverter 64. To the contrary, when the first motor generator MG1 is generating electric power, the electric power generated by the first motor generator MG1 is supplied to the HV battery 61 via the first inverter 63. When the second motor generator MG2 is generating electric power, the electric power generated by the second motor generator MG2 is supplied to the HV battery 61 via the second inverter 64 in the same manner as the above.

The auxiliary battery 62 is a chargeable/dischargeable secondary battery that supplies electric power to ECUs (i.e., the power management ECU 70, the battery ECU 71, the motor ECU 72 and the engine ECU 73), sensors 81-85, 91-98, and auxiliary components (e.g., lamps of the vehicle and audio equipment, which are not illustrated in the figure) to operate them or stores electric power generated at the first motor generator MG1 and the second motor generator MG2 through a DC-DC converter 65. The auxiliary battery 62 has the smaller rated voltage and the smaller capacity compared with the HV battery The auxiliary battery 62 is electrically-connected to the first motor generator MG1 via the DC-DC converter 65 and the first inverter 63, electrically-connected to the second motor generator MG2 via the DC-DC converter 65 and the second inverter 64, and electrically-connected to the battery ECU 71. In other words, the auxiliary battery 62 is connected to the first motor generator MG1, the second motor generator MG2, the DC-DC converter 65 and the battery ECU 71 via always-connected energizing paths thereto.

When the first motor generator MG1 is generating electric power, the electric power generated by the first motor generator MG1 is supplied to the auxiliary battery 62 via the first inverter 63 and the DC-DC converter 65. When the second motor generator MG2 is generating electric power, the electric power generated by the second motor generator MG2 is supplied to the auxiliary battery 62 via the second inverter 64 and the DC-DC converter 65 in the same manner as the above. In addition, the auxiliary battery 62 does not supply electric power to the first motor generator MG1 and the second motor generator MG2 to rotationally-drive the generators.

The DC-DC converter 65 is configured to convert (decrease, in this embodiment) the electric power (voltage) supplied to the auxiliary battery 62 from the first motor generator MG1 and the second motor generator MG2 into an appropriate voltage.

In addition, the electric power generated by the first motor generator MG1 can be directly supplied to the second motor generator MG2, and the electric power generated by the second motor generator MG2 can be directly supplied to the first motor generator MG1.

The power management ECU 70 (hereinafter referred to as "PMECU 70") is connected to the battery ECU 71 and the motor ECU 72 so as to allow communications to exchange information with the battery ECU 71, the motor ECU 72 and the engine ECU 73. As a result, the information relating to the batteries (61, 62) is input to/output from the PMECU 70 through the battery ECU 71, the information relating to the inverters (63, 64) and the resolvers (97, 98) is input to/output from the PMECU 70 through the motor ECU 72, and the information relating to the sensors (91 to 95) is input to/output from the PMECU 70 through the engine ECU 73.

For example, the state of charge SOC of the HV battery 61 is input to the PMECU 70, which value is calculated in the battery ECU 71. The state of charge SOC is calculated based on an accumulated value of inflow/outflow current of the HV battery 61, etc., by using well-known methods. The voltage at a terminal of the auxiliary battery 62 is also input to the PMECU 70, which value is calculated in the battery ECU 71. The PMECU 70 manages the voltage at the terminal of the auxiliary battery 62 so as to maintain the voltage of the terminal at a predetermined value (e.g., 12V). The PMECU 70 can determine whether or not the batteries (71, 72) is dismounted from the vehicle (for example, whether or not the always-connected energizing paths to the batteries had been once interrupted and the paths were re-connected after that) based on these input information.

Furthermore, a signal representing the rotational position of the rotary shaft 41 of the first motor generator MG1 and a signal representing the rotational position of the rotary shaft 42 of the second motor generator MG2 are input to the PMECU 70 through the motor ECU 72.

Additionally, a various sort of output signals representing the engine status is input to the PMECU 70 through the engine ECU 73. The output signals representing the engine status includes output signals generated from an air flow meter 91, a throttle valve position sensor 92, a coolant water temperature sensor 93, an engine rotation speed sensor 94, a knocking sensor 95 and an air-fuel ratio sensor 96.

Still furthermore, the PMECU 70 is connected to a power switch 81, a shift position sensor 82, an accelerator position sensor 83, a brake switch 84 and a vehicle speed sensor 85, and hence output signals generated from the sensors are input thereto.

The PMECU 70 sends instructions for controlling the batteries (61, 62) to the battery ECU 71, instructions for controlling the motor generators (MG1, MG2) to the motor ECU 72, and instructions for controlling the engine 20 to the engine ECU 73, based on the input information. Additionally, the PMECU 70 stores and keeps parameters, etc., required for those instructions (e.g., the offset amounts of the first motor generator MG1 and the second motor generator MG2, and parameters relating to the control of the air-fuel ratio of the engine 20). Note that the first device is configured to keep the offset amounts of the first motor generator MG1 and the second motor generator MG2 in the PMECU 70 without relying on electric power supplied from batteries (the auxiliary battery 62).

For example, the battery ECU 71 keeps the voltage at the terminal of the auxiliary battery 62 at a predetermined value based on instructions from the PMECU 70.

Furthermore, the motor ECU 72 sends instruction signals to the first inverter 63 and the second inverter 64 based on instructions from the PMECU 70. The motor ECU 72 thereby controls the first motor generator MG1 by using the first inverter 63 and also the second motor generator MG2 by using the second inverter 64.

Additionally, the engine ECU 73 controls the engine 20 by sending instruction signals to the throttle valve actuator 22a, the fuel injector 23 and the ignition device 24, etc., based on instructions from the PMECU 70.

The power switch 81 is a system start-up switch of the hybrid vehicle 10. The PMECU 70 is configured to start-up the system (i.e., set it to the ready-on state) when the power switch 81 is used under the condition that a vehicle key is inserted into a key slot and a brake pedal is depressed, which components are not illustrated in the figure.

The shift position sensor 82 is configured to generate signals representing a shift position that is selected with a shift lever installed at a location adjacent to the driver's seat in the hybrid vehicle 10 to enable the driver to handle the shift lever, which lever is not illustrated in the figure. The shift positions include P (the parking position), R (the reverse position), N (the neutral position), D (the drive position) and B (the position where the engine brake is to be actively used).

The accelerator position sensor 83 is configured to generate output signals representing the degree of control of an accelerator pedal that is installed to enable the driver to handle the accelerator pedal, which pedal is not illustrated in the figure.

The brake switch 84 is configured to generate output signals representing that the brake pedal is being used when the brake pedal is pushed, which pedal is installed to enable the driver to handle the brake pedal and is not illustrated in the figure.

The vehicle speed sensor 85 is configured to generate output signals representing the speed of the hybrid vehicle 10.

The air flow meter 91 is configured to measure the amount of air entered into the engine 20 per unit time and generate signals representing the amount of air (intake air amount).

The throttle valve position sensor 92 is configured to measure the opening degree of the throttle valve 22 (i.e., throttle valve position) and generate signals representing the measured throttle valve position.

The coolant water temperature sensor 93 is configured to measure the temperature of coolant water of the engine 20 and generate signals representing the measured temperature of the coolant water.

The engine rotation speed sensor 94 is configured to generate pulse signals with every predetermined angle rotation of the crankshaft 25 in the engine 20. The engine ECU 73 obtains the number of rotation of the crankshaft 25 per unit time (i.e., engine rotation speed) based on the pulse signals.

The knocking sensor 95 is installed on the surface part of the engine 20. The knocking sensor 95 is configured to measure the vibration of the engine 20 and generate signals depending on the vibration. The engine ECU 73 obtains the knock intensity based on the signals.

The air-fuel ratio sensor 96 is installed at a location lay upstream of the exhaust purification catalyst 28a, which location is in a portion of the exhaust manifold 26 to which portion the exhaust gas is to be collected. The air-fuel ratio sensor 96 is so-called "limiting current wide-range air-fuel ratio sensor". The air-fuel ratio sensor 96 is configured to measure the air-fuel ratio of exhaust gas and generate output signals depending on the air-fuel ratio measured on the exhaust gas (measured air-fuel ratio). The engine ECU 73 obtains the measured air-fuel ratio based on the output value.

The resolver 97 is a rotational position detector to detect rotational positions of the rotary shaft 41 of the first motor generator MG1. The resolver 97 is installed on the rotary shaft 41 of the first motor generator MG1 so as not to allow the rotor of the resolver 97 to cause relative rotation with respect to the rotary shaft 41. As a result, the rotor of the resolver 97 rotates along with the rotation of the rotary shaft 41. The resolver 97 is configured to output signals depending on the rotational position of the rotary shaft 41. The motor ECU 72 obtains the rotational position of the rotary shaft 41 based on the signals. The motor ECU 72 also obtains the rotational speed Nm1 of the rotary shaft 41 based on the change of the signals per unit time.

The resolver 98 is a rotational position detector to detect rotational positions of the rotary shaft 42 of the second motor generator MG2. The resolver 98 is installed on the rotary shaft 42 of the second motor generator MG2 so as not to allow the rotor of the resolver 98 to cause relative rotation with respect to the rotary shaft 42. As a result, the rotor of the resolver 98 rotates along with the rotation of the rotary shaft 42. The resolver 98 is configured to output signals depending on the rotational position of the rotary shaft 42. The motor ECU 72 obtains the rotational position of the rotary shaft 42 based on the signals. The motor ECU 72 also obtains the rotational speed Nm2 of the rotary shaft 42 based on the change of the signals per unit time.

These are the schematic configuration of a system where the first device is applied to a hybrid vehicle 10.

<Concept of Performing Control>

Figure 2:
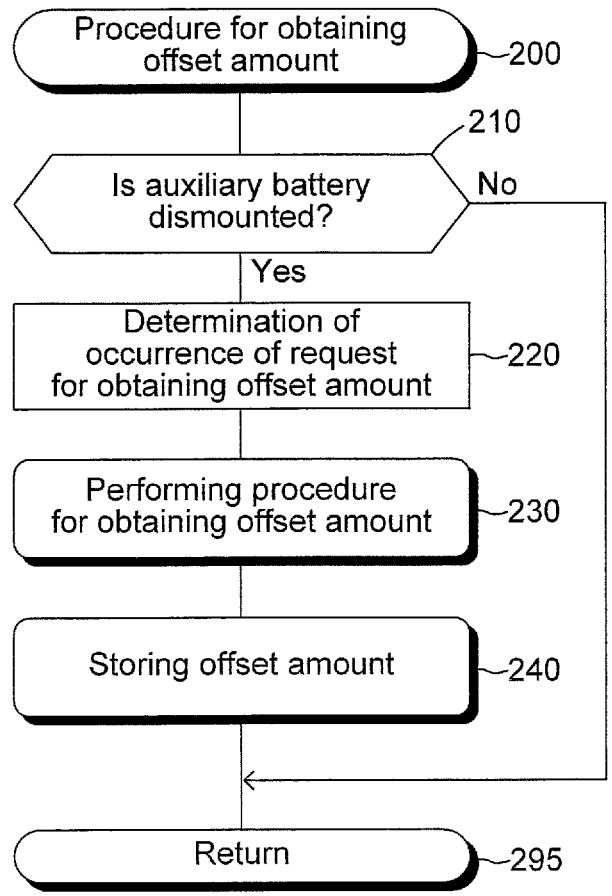
FIG. 2 is a schematic flowchart illustrating the way of the control executed by the control device according to the first embodiment of the invention.

Next, the concept of performing the control in the first device will be described by referring to FIG. 2. FIG. 2 is a flowchart illustrating the way of the control executed by the first device. In the case that a member that has an impact on the offset amount is in need of replacement or the like, with regard to the vehicle 10 in which the first device is applied, the auxiliary battery 62 is to be usually dismounted from the vehicle 10 as a secondary member.

The first device, then, determines whether or not the auxiliary battery 62 is dismounted from the vehicle 10 at step 210 in FIG. 2. This is determined based on the information input to the PMECU 70 through the battery ECU 71 (i.e., the information on the voltage at the terminal of the auxiliary battery 62) as described above. In particular, the first device determines that the auxiliary battery 62 is dismounted from the vehicle 10 when the always-connected energizing path to the auxiliary battery 62 had been once interrupted and the path was re-connected after that.

The first device proceeds to step 220 when determining that "the auxiliary battery 62 is dismounted from the vehicle 10", and determines that "the need to obtain the offset amount arises". After that, the first device performs the procedure for obtaining the offset amount at step 230. The offset amounts of the resolver 97, 98 are thereby obtained again. Furthermore, the first device stores the obtained offset amounts in the PMECU 70 at step 240.

Note that the first device performs the procedure for obtaining the offset amount in accordance with an appropriate measuring procedure in consideration of required accuracy for obtaining the offset amount on the procedure and status of vehicle 10, etc. For example, the first device may employ at least one of the following measuring procedure (1) and (2) as the procedure for obtaining the offset amount.

Measuring Procedure (1)

In the case that the rotary shaft of the motor generator does not rotate, the value of the q-axis current is obtained while generating the predetermined detective magnetic field around the rotor of the motor generator (for example, in the case that the rotational position of the rotor calculated from the output value of the resolver is angle θr, while generating the magnetic field so that the direction of magnetic flux sequentially moves from angle θr−10 deg to angle θr+10 deg). After that, angle θmin that corresponds to the detective magnetic field (the direction of magnetic flux thereof) where the absolute value of the amount of the q-axis current is the minimum value is specified. In this instance, "the difference between angle θmin and angle θr" represents the offset amount, and thus the offset amount is obtained based on the difference.

Measuring Procedure (2)

In the case that the rotary shaft of the motor generator rotates, the d-axis voltage is obtained while the motor generator is being controlled so that the d-axis current and the q-axis current are zero (in other words, the output torque is zero). In this instance, the magnitude of the angle between the horizontal axis (the d-axis) in the magnetic polar coordinate system (the d-q coordinate system) and the direction of the obtained d-axis voltage varies depending on the amount of the offset amount, and thus the offset amount is obtained based on the angle. Note that the control signal to the motor generator can be controlled so that the magnitude of the angle is zero, without actually obtaining the offset amount.

These are the descriptions of the first device.

Second Embodiment

Next, an embodiment to explain the control device of the present invention more specifically will be described below. The control device according to this embodiment is hereinafter referred to as "second device".

<Concept of Performing Control>

The procedure for obtaining the offset amount may require that the status of the vehicle 10 is a specific status in order to perform the procedure appropriately depending on the procedure to be employed, as described above. In view of this, the procedure for obtaining the offset amount is eventually performed, with regard to the second device, only in the case that the second device determines that the need to obtain the offset amount arises in accordance with the same concept as the first device, and after that the condition to enable the procedure is satisfied.

Figure 3:
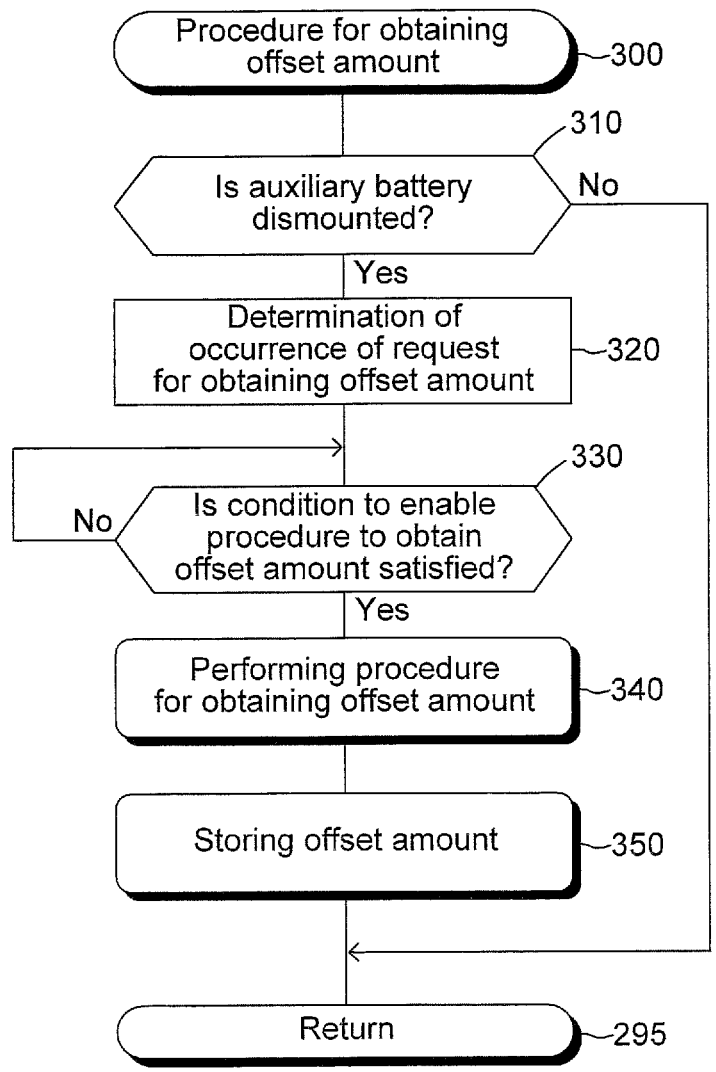
FIG. 3 is a schematic flowchart illustrating the way of the control executed by the control device according to the second embodiment of the invention.

The concept of performing the control in the second device will be described by referring to FIG. 3. FIG. 3 is a flowchart illustrating the way of the control executed by the second device.

The second device determines whether or not the auxiliary battery 62 is dismounted from the vehicle 10 at step 310 in FIG. 3 in accordance with the same concept as the first device. The second device proceeds to step 320 when determining that "the auxiliary battery 62 is dismounted from the vehicle 10", and determines that "the need to obtain the offset amount arises".

Next, the second device determines whether or not "the condition to enable the procedure for obtaining the offset amount (the procedural condition for obtaining the offset amount)" is satisfied at step 330. This condition is defined in accordance with the employed measuring procedure as the procedure for obtaining the offset amount.

For example, in the case that the measuring procedure (1) is employed, it is determined, when the both of the following conditions (1-1) and (1-2) are satisfied, that the condition to enable the procedure for obtaining the offset amount is satisfied.

(Condition 1-1) The PMECU 70 receives the instruction to start-up the system because the power switch 81 of the vehicle 10 is pushed.

(Condition 1-2) The rotary shaft (41, 42) of the motor generator, for which the procedure is performed, is not rotating.

On the other hand, for example, in the case that the measuring procedure (2) is employed, it is determined, when the both of the following conditions (2-1) and (2-2) are satisfied, that the condition to enable the procedure for obtaining the offset amount is satisfied.

(Condition 2-1) The rotary shaft (41, 42) of the motor generator, for which the procedure is performed, is rotating at a rotational speed of a predetermined speed or more.

(Condition 1-2) The drivability of the vehicle 10 does not excessively deteriorate even when the motor generator is controlled so that the output torque thereof is zero.

In the case that the condition to enable the procedure for obtaining the offset amount is not satisfied, the second device repeats the process of step 330 until the condition is satisfied (in other words, the procedure is withheld until the condition is satisfied). After that, when the condition is satisfied, the second device proceeds to step 340 to perform the procedure, and stores the obtained offset amount in the PMECU 70 at step 350.

These are the descriptions of the second device.

General Overview of Embodiments

As described referring to FIG. 1 to FIG. 3, the control device according to the embodiments of the present invention (the first device and the second device) is applied to the vehicle 10 having a motor MG1, MG2 with a rotary shaft 41, 42 connected to a drive shaft 53 of the vehicle 10, a rotational position detector 97, 98 to detect a rotational position of the rotary shaft 41, 42 of the motor MG1, MG2, and a battery 62.

The control device (PMECU 70) according to the embodiments of the present invention comprises a configuration to perform a procedure for obtaining an offset amount in response to a request for obtaining the offset amount (for example, step 230 in FIG. 2), store the obtained offset amount (for example, step 240 in FIG. 2), and keep the stored offset amount without relying on electric power supplied from the battery 62, which offset amount is a difference between a detected rotational position of the rotary shaft 41, 42 with the rotational position detector and an actual rotational position of the rotary shaft 41, 42.

The control device 70 according to the embodiments of the present invention is configured to find an occurrence of the request for obtaining the offset amount upon the battery 62 is dismounted from the vehicle 10 (for example, step 210 and step 220 in FIG. 2).

Furthermore, the control device 70 according to the embodiments of the present invention (the second device) is configured as follows:

the control device 70 further determine whether or not a condition to enable the procedure for obtaining the offset amount is satisfied (step 330 in FIG. 3) in the case of finding the occurrence of the request for obtaining the offset amount (step 320 in FIG. 3);

the control device performs the procedure for obtaining the offset amount (step 340 in FIG. 3) in the case of the condition is satisfied (when being determined as "Yes" at step 330); and the control device withholds the procedure for obtaining the offset amount until the condition is satisfied (the control device repeats the process of step 330) in the case of the condition is not satisfied (when being determined as "No" at step 330).

By the way, the control device 70 according to the embodiments of the present invention (the first device and the second device) is configured so as to determine the battery 62 is dismounted from the vehicle 10 in the case that an always-connected energizing path to the battery 62 was once interrupted and followed by the path is re-connected.

In addition, the vehicle 10, to which the control device 70 according to the embodiments of the present invention is applied, is generally configured so that the battery 62 is dismounted from the vehicle 10 when a member having an impact on the offset amount (e.g., the motor generator MG1, MG2 and the rotational position detector 97, 98) is dismounted from the vehicle 10.

Other Embodiments

The present invention is not limited within the above specific embodiments, various modifications corrections may be made without departing from the scope of the invention.

For example, the vehicle 10, to which the control device of each embodiment (the first device and the second device) is applied, has two motors (the first motor generator MG1 and the second motor generator MG2). The control device of the present invention, however, may be applied to a vehicle having one motor or a vehicle having three or more motors.

Furthermore, the vehicle 10, to which the control device of each embodiment (the first device and the second device) is applied, is a hybrid vehicle having the motor MG1, MG2 and the engine 20. The control device of the present invention, however, may be applied to an electric vehicle, which does not have any internal combustion engine.

In addition, the PMECU 70, as the control device, is configured to store the offset amount with regard to the control device of each embodiment (the first device and the second device). However, any combination of multiple ECUs including other ECUs (e.g., the motor ECU 72) may be regarded as the control device of the present invention, and the offset amount may be stored in any ECU (e.g., the motor ECU 72) other than the PMECU 70.

Furthermore, several conditions (Condition 1-1, 1-2, 2-1 and 2-2) are listed above as the condition to enable the procedure to obtain the offset amount, which conditions correspond to the measuring procedures (1) and (2), with regard to the control device of each embodiment (the first device and the second device). The condition to enable the procedure to obtain the offset amount, however, may be a condition defined in consideration of the process of the procedure for obtaining the offset amount, as described above.

As described above, the present invention is applicable as the control device that is applied to a vehicle having a motor, a rotational position detector, and a battery.

The invention claimed is:

1. A control device for a vehicle, the vehicle having: (i) a motor with a rotary shaft connected to a drive shaft of the vehicle, (ii) a rotational position detector configured to detect a rotational position of the rotary shaft of the motor, and (iii) a battery, the control device comprising:
 an electronic control unit configured to:
  obtain an offset amount in response to a request for obtaining the offset amount, the offset amount being a difference between a detected rotational position of the rotary shaft and an actual rotational position of the rotary shaft,
  find an occurrence of the request for obtaining the offset amount upon the battery being dismounted from the vehicle, and
  output the obtained offset amount to the motor upon the battery being re-mounted to the vehicle; and
 a computer readable storage medium configured to:
  store the obtained offset amount, and
  keep the stored offset amount without relying on electric power supplied from the battery.

2. The control device according to claim 1, wherein the electronic control unit is configured to:
 determine whether a condition to enable the procedure for obtaining the offset amount is satisfied when finding the occurrence of the request for obtaining the offset amount,
 perform the procedure for obtaining the offset amount when the condition is satisfied, and
 withhold obtaining the offset amount until the condition is satisfied when the condition is not satisfied.

3. The control device according to claim 2, wherein the electronic control unit is configured to determine that the battery is dismounted from the vehicle when an always-connected energizing path to the battery having been once interrupted is re-connected.

4. The control device according to claim 3, wherein the battery is dismounted from the vehicle when a member having an impact on the offset amount is dismounted from the vehicle.

5. The control device according to claim 2, wherein the battery is dismounted from the vehicle when a member having an impact on the offset amount is dismounted from the vehicle.

6. The control device according to claim 1, the electronic control unit is configured to determine that the battery is dismounted from the vehicle when an always-connected energizing path to the battery having been once interrupted is re-connected.

7. The control device according to claim 6, wherein the battery is dismounted from the vehicle when a member having an impact on the offset amount is dismounted from the vehicle.

8. The control device according to claim 1, wherein the battery is dismounted from the vehicle when a member having an impact on the offset amount is dismounted from the vehicle.

* * * * *